United States Patent [19]

Chenausky et al.

[11] Patent Number: 4,521,109
[45] Date of Patent: Jun. 4, 1985

[54] PASSIVELY Q-SWITCHED DUAL LASER

[75] Inventors: Peter P. Chenausky, Avon, Conn.; Robert J. Mongeon, East Longmeadow, Mass.; Lanny M. Laughman, Bolton, Conn.

[73] Assignee: United Technologies Corporation, Hartford, Conn.

[21] Appl. No.: 600,041

[22] Filed: Apr. 13, 1984

Related U.S. Application Data

[62] Division of Ser. No. 369,303, Apr. 16, 1982.

[51] Int. Cl.³ .............................................. G01B 9/02
[52] U.S. Cl. .................................... 356/349; 356/4.5; 378/10
[58] Field of Search ....................... 378/64, 97, 93, 10, 378/11, 26, 102, 20; 356/4.5, 349

[56] References Cited

U.S. PATENT DOCUMENTS

| | | | |
|---|---|---|---|
| 3,199,400 | 8/1965 | Zabinski | 356/4.5 |
| 3,970,963 | 7/1976 | Chester | 378/97 |
| 4,103,255 | 7/1978 | Schlossberg | 378/64 |
| 4,174,504 | 11/1979 | Chenausky | 378/11 |
| 4,176,327 | 11/1979 | Wayne et al. | 378/12 |
| 4,241,319 | 12/1980 | Papaysanou | 378/20 |

Primary Examiner—William L. Sikes
Assistant Examiner—Léon Scott, Jr.
Attorney, Agent, or Firm—Eric W. Petraske

[57] ABSTRACT

A passively Q-switched laser system uses a common Q-switch cell to control two lasers. The first laser to turn on Q-switches the other laser.

2 Claims, 2 Drawing Figures

PASSIVELY Q-SWITCHED DUAL LASER

This is a division of application Ser. No. 369,303 filed on Apr. 16, 1982.

DESCRIPTION

1. Technical Field

The field of the invention is that of passively Q-switched lasers.

2. Background Art

It is known in the art to accomplish passive Q-switching by means of a bleachable material or a saturable absorber such as $SF_6$. The use of a pair of waveguides contained within a single block for forming a pair of waveguide lasers is disclosed in U.S. Pat. No. 4,214,319 in which Q-switching is accomplished by means of a Stark active modulator. Such modulators provide switching of the two laser beams at the same time, but have the disadvantages that they are expensive, operate on a limited number of $CO_2$ laser transitions, and have unwanted gas breakdown problems associated with the required modulating electric fields.

U.S. Pat. No. 3,496,487 discloses a pair of lasers in which one laser controls the turn-on time of a second laser by bleaching a dye cell within the cavity of the second laser, using the output beam of the first laser to do so.

An article entitled Synchronization of Giant Pulse Lasers, by Opower and Kaiser in Physics Letters 21, 6, pp. 638-640 discloses a system in which a first laser triggers two other lasers simultaneously.

DISCLOSURE OF INVENTION

The invention relates to a passively Q-switched pair of lasers employing a single cell for Q-switching, in which the problem of Q-switching both lasers at the same time is solved by feeding power from each laser beam back into the Q-switch cell so that the first laser to turn on augments the switching process for the other laser.

BEST MODE FOR CARRYING OUT THE INVENTION

Figure 1:
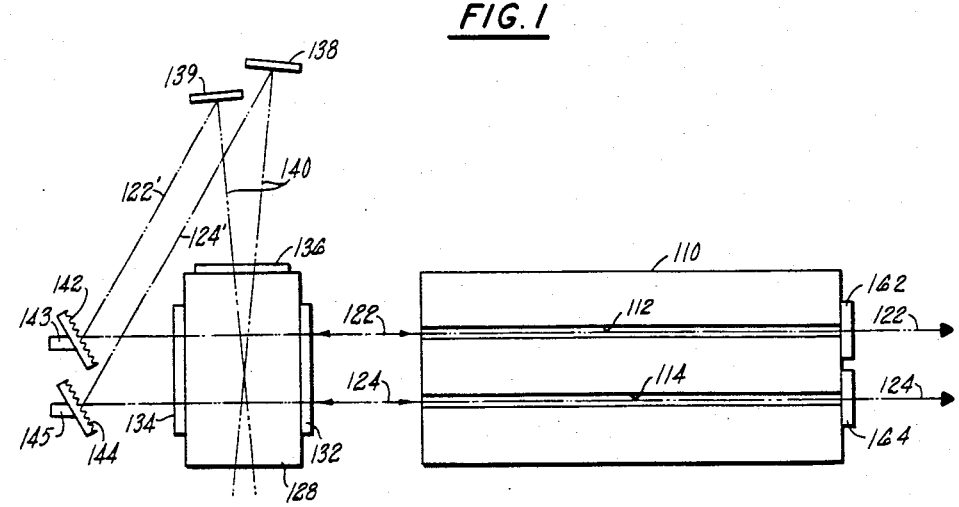
FIG. 1 illustrates in partially pictorial, partially schematic form an embodiment of the invention.

In FIG. 1, two laser waveguides 112 and 114 are contained within a common ceramic block 110, shown in cross section in this figure. The two lasers in this particular embodiment are RF excited by electrodes perpendicular to the plane of the paper. The electrodes and other components of the laser are omitted from the drawing for clarity. Two laser beams 122 and 124 are generated within waveguides 112 and 114 respectively. These two laser beams are Q-switched within $SF_6$ cell 128 which obstructs the passage of laser radiation from each waveguide, thereby preventing the resonance of that radiation between gratings 142 and 144 and end mirrors 162 and 164 which form a pair of optical cavities. When the intensity of spontaneous radiation in each waveguide resonator is sufficiently strong, the $SF_6$ absorber is saturated, and the radiation can pass through it and stimulated lasing action can then evolve. In general, one of the two lasers will reach threshold first. However, for subsequent heterodyne detection of the return signals substantial coemission is necessary.

Random jitter is reduced and coemission of two nearly simultaneous laser pulses is augmented in this embodiment by feeding back a small fraction of the laser power within the $SF_6$ cell so that the first laser to turn on saturates the cell along both optical paths. The two gratings 142 and 144 are constructed so that the bulk of the power impinging on them is returned back in the direction from which it came, but a small fraction of the power is specularly reflected along beam lines 122' and 124' respectively. This effect is normally achieved when the grating is blazed for Littrow operation. The deflected beams strike mirrors 139 and 138 respectively, which direct the power back through side window 136 of cell 128 along a path generally perpendicular to the paths of beams 122 and 124. Thus, whichever of the two lasers reaches threshold first, a fraction of the power will be tapped off and re directed through cell 128 to saturate the absorber in a region intersecting the other beam path.

In this particular drawing, the sample beams are shown as having no magnification, but those skilled in the art will easily be able to insert any optics required to expand the sample beams 122' and 124' to a size sufficient to cover any desired portion of cell 128. The use of two mirrors 138 and 139 is also not necessary, and a single plane mirror or a single mirror which is bent may be used depending on the particular embodiment. The frequencies of beams 122 and 124 may be controlled by means of piezoelectric actuators 143 and 145 which control the position of gratings 142 and 144 respectively and therefore control the exact frequency of oscillation. The frequency of each beam may be monitored and actuators 143 and 145 can be controlled by conventional frequency monitoring and control devices known to those skilled in the art.

Figure 2:
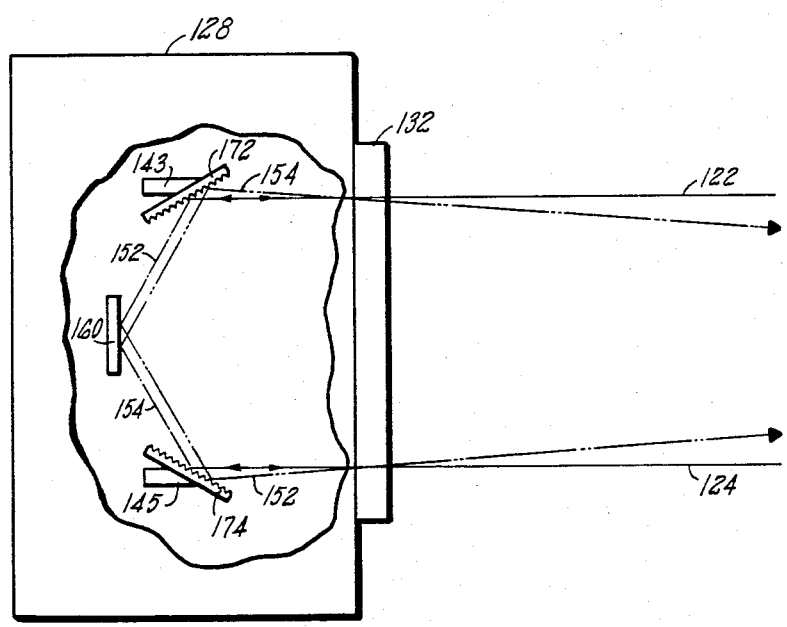
FIG. 2 illustrates an alternative embodiment for coupling the two beams.

An alternative embodiment of cell 128 is illustrated in FIG. 2, in which beams 122 and 124 enter the cell as before through window 132. Gratings 172 and 174, positioned by actuators 143 and 145 as before, direct back most of the power back along the beam line as in the embodiment of FIG. 1. A portion of the power is directed along beams 152 and 154, as are beams 122' and 124' in the embodiment of FIG. 1. These beams 152 and 154 are deflected by mirror 160 to the other grating and back toward waveguide block 110. The frequencies of beams 152 and 154 are maintained at predetermined different values by means of actuators 143 and 145, so that beam 154 is not parallel to beam 122 and beam 152 is not parallel to beam 124. This lack of parallelism is designed to be sufficiently great that neither laser will inadvertently injection control the other. The two beams 152 and 154 overlap the main beams 122 and 124, however, so that bleaching of both channels is achieved by the first laser to turn on and the time jitter between lasers is reduced, as in the embodiment of FIG. 1.

It is known in the art that the pulse width of the output beam of an $SF_6$ Q-switched $Co_2$ laser tends to be approximately 200 nanoseconds wide. If the laser is used for laser radar ranging applications, then the range uncertainly will be limited by the accuracy with which the leading edge of the pulse can be determined. The range is, of course, determined by measuring the time lapse between the exiting pulse and the returning pulse and this time is measured by looking at some predetermined point on the leading edge of the packet. The pulse shape will be degraded in time so that the returning pulse will have a less sharply defined leading edge than the exiting pulse. The length of a 200 nanosecond pulse packet is approximately 200 feet and only the leading edge or some other representative fiducial character may be used in a conventionally configured radar.

If, however, two different frequencies ($f_1$ and $f_2$) are generated in the two lasers and these laser frequencies are separated in magnitude by some convenient amount in the range of tens of megahertz, then the two frequencies will beat to produce a net heterodyne signal ($f_1-f_2$) which has a wavelength comparable to or less than the length of the pulse packet and may be used to enhance the range resolution. If the phase of the heterodyne signal formed from returning wave packet is measured, either on a single pulse basis or on a pulse-to-pulse basis (assuming there is sufficient pulse-to-pulse coherence), then the target location may be determined within the length of the packet spread as accurately as the phase may be measured.

Incremental phase detection and processing have been employed with cw systems in the prior art and this technique permits a more precise determination of target location. Typically, when the technique is implemented with cw laser transmitters, either intracavity or extracavity FM modulation is imposed on the laser carrier frequency. The FM modulation is equivalent to generating the two frequencies $f_1$ and $f_2$ with the notable exception that the range of the target can only be determined with ambiguity related to a multiple of the wavelength corresponding to the frequency $f_1-f_2$. The limited choice of FM modulators for $CO_2$ lasers, their power handling capability and the resulting system ambiguity characteristic renders this system less effective in practice than it would appear in principle.

A laser radar system configured using the teachings herein disclosed has the advantage that the range ambiguity is removed by the coarse range information associated with the round trip time-of-flight for the emitted pulse packet of either laser. The relative frequency stability of the two pulsed lasers, which is derived from the near total mechanical, optical and electrtical commonality of the twin laser package permits the extraction of additional fine range information by comparing the alteration in relative phase between the twin laser packets due to propagation to and reflection from the target of interest. This information is extracted from an observation of not either but both laser pulses at frequencies $f_1$ and $f_2$ in an exactly analogous manner to the cw-FM modulated system. Without superior short-term stability between the two pulsed lasers, and intrapulse phase information could not necessarily be associated with fine target information. A cw $CO_2$ twin laser constructed according to a recent copending application has achieved a passive relative frequency stability of 30 KHz for 5 seconds and active stabilization of this laser has allowed a very highly significant improvement in this baseline frequency stability. The resulting radar system is simple, compact and rugged by virtue of the fact that the active modulator for the system has been replaced by a simple saturable absorbing gas cell which produces well behaved reproducible pulsing with a cw rather than pulsed discharge, and which further functions without requiring a high voltage RF modulation source for the modulation crystal.

We claim:

1. A laser ranging system for measuring round trip time to a target comprising:
    laser means for generating simultaneously a pair of pulsed optical beams at first and second optical frequencies separated by a predetermined frequency $\Delta f$;
    heterodyne means for detecting an interference signal at said frequency $\Delta f$ having an initial phase;
    heterodyne means for detecting return radiation of said first and second frequencies and for generating a return signal at said frequency $\Delta f$ having a return phase;
    phase means for measuring the phase difference between said initial phase and said return phase;
    means for generating a coarse measurement of said round trip time; and
    means for combining said phase difference with said coarse measurement of said round trip time to form an improved round trip time measurement.

2. A laser ranging system according to claim 1, in which said laser means comprises:
    a first optical cavity having a first optical axis;
    a second optical cavity having a second optical axis; said first and second optical cavities constitute two laser waveguides being contained within a common block;
    a passive Q-switch cell common to both lasers and disposed to intersect both said first and second optical axes;
    means for resonating optical radiation along said first and second axes; such that the first laser to turn on Q-switches the other laser.

* * * * *